United States Patent [19]
Shimauchi et al.

[11] Patent Number: 5,999,490
[45] Date of Patent: Dec. 7, 1999

[54] FLASHER TYPE FISH SONAR

[75] Inventors: Yoshio Shimauchi; Tetsuya Yamamoto; Yoshikazu Muramatsu, all of Aich-ken, Japan

[73] Assignee: Honda Electronics Co., Ltd., Toyohashi, Japan

[21] Appl. No.: 09/271,797

[22] Filed: Mar. 18, 1999

[30] Foreign Application Priority Data

Mar. 18, 1998 [JP] Japan .................................. 10-085922
Mar. 18, 1998 [JP] Japan .................................. 10-085923

[51] Int. Cl.⁶ .................................................... G01S 15/96
[52] U.S. Cl. ............................................ 367/111; 367/109
[58] Field of Search ..................................... 367/109, 111

[56] References Cited

U.S. PATENT DOCUMENTS 3,964,012  6/1976  Yamamoto et al. ..................... 367/109
5,065,371  11/1991  Leavell et al. ........................... 367/111

*Primary Examiner*—Ian J. Lobo
*Attorney, Agent, or Firm*—Burgess, Ryan & Wayne

[57] ABSTRACT

Reflected digital signals of a surface of the water, fish and a bottom are displayed by a usual scale on a half portion of the display board, reflected digital signals of fish and a bottom are reversely read from the second buffer function and are displayed at an enlarged scale on a second half portion of the display board, whereby the surface of the water is displayed on the upper portion of the display board and the bottom of the water is displayed on the lower portion of the display board and the flasher display is very easy to understand and fish inhabiting near the bottom and the bottom are displayed on an enlarged scale.

3 Claims, 10 Drawing Sheets

FLASHER TYPE FISH SONAR

BACKGROUND OF THE INVENTION

The present invention relates to a flasher type fish sonar for displaying fish and a bottom of the water by luminosity of a luminous body in a window of a display board.

In a prior art flasher type fish sonar, a circular window is formed in the periphery of a display board provided on the front of a case, a light emitting body, mounted on a rotary disk, is arranged opposite the window, the rotary first is rotated by a motor and a sensor is fixed on the "0" position of the display board.

In this flasher display, when the light emitting body is detected by the sensor, output signals from a control means are applied to an oscillating circuit, oscillating signals from the oscillating circuit are applied to an ultrasonic transducer, and ultrasonic waves from the ultrasonic transducer are emitted to the water.

When reflected ultrasonic waves are received by the ultrasonic transducer and are converted to the reflected signals amplified by a receiving circuit and are converted to digital reflected signals by an analogue to a digital converter, the digital signals are transmitted from the control means to the light emitting body of the display apparatus whereby positions of fish and the bottom of the water are displayed on the window of the display apparatus.

In such a flasher type fish sonar, because "0" graduation is fixed on the upper portion of the display board, each of the depth graduations are shown on the display board by right-handed rotation, and the graduation of the deepest portion is shown near the "0" graduation. The luminosity of the second reflected signal of the bottom is displayed on the portion of the display board which is higher than the lowest portion of the display board. Thus it is hard to distinguish the luminosity of the "0" graduation and the luminosity of the second reflected signal. Also, in the deep range, because the light of the bottom position is displayed on the portion of the display board which is above the position of the fish, it is hard to distinguish the luminosity of the "0" graduation and the luminosity of the bottom.

SUMMARY OF THE INVENTION

It is therefore, an object of the present invention to provide a flasher type fish sonar in which the usual reflected signals are displayed on a first half part of a display board and reflected signals in a designated depth range are displayed by an enlarged scale on a second half part of the display board.

It is another object of the present invention to provide a flasher type fish sonar in which the usual display and the display in the designated depth range are switched by first and second sensors.

In order to accomplish the above and other objects, the present invention comprises an oscillating circuit for transmitting oscillating signals to an ultrasonic transducer for emitting ultrasonic waves and reflected signals, a receiving circuit for amplifying reflected signals of ultrasonic waves emitted in the water and received by the transducer, an analogue to digital converter for converting the reflected signals amplified by the receiving circuit to reflected digital signals, first and second memories for memorizing the reflected digital signals, a control means having first and second buffer function means for storing the reflected digital signals read out from the first and second memories respectively, a reverse read function means, and a flasher display having a display board having a circular window, a rotary disc for carrying the light emitting body opposite the circular window by application of the reflected digital signals from the analogue to digital circuit, a first sensor installed at an "0" position of the display disc in the circular window and a second sensor installed at a position opposite the "0" position of the circular window, whereby the usual reflected digital signals of the surface of the water, the fish and the bottom are displayed on a first half portion of the display board by reading out the reflected digital signals in the first buffer function means of the control means when the light emitting body is detected by the first sensor at the "0" position, and reflected digital signals of a surface of the water, fish and a bottom are read from the second buffer function means in reverse and are displayed in an enlarged scale when the light emitting body is detected by the second sensor.

DESCRIPTION OF THE PREFERRED EMBODIMENT

Figure 1:
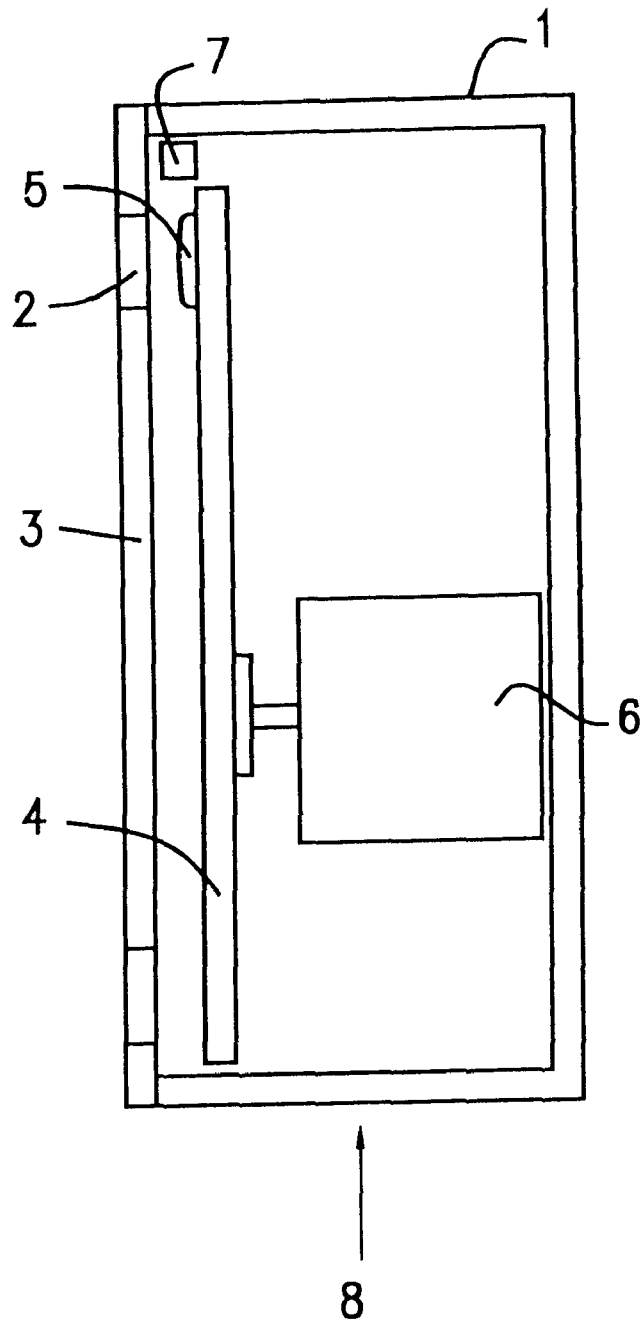
FIG. 1 is a side sectional view of a flasher display of a fish sonar of the prior art.
Figure 2:
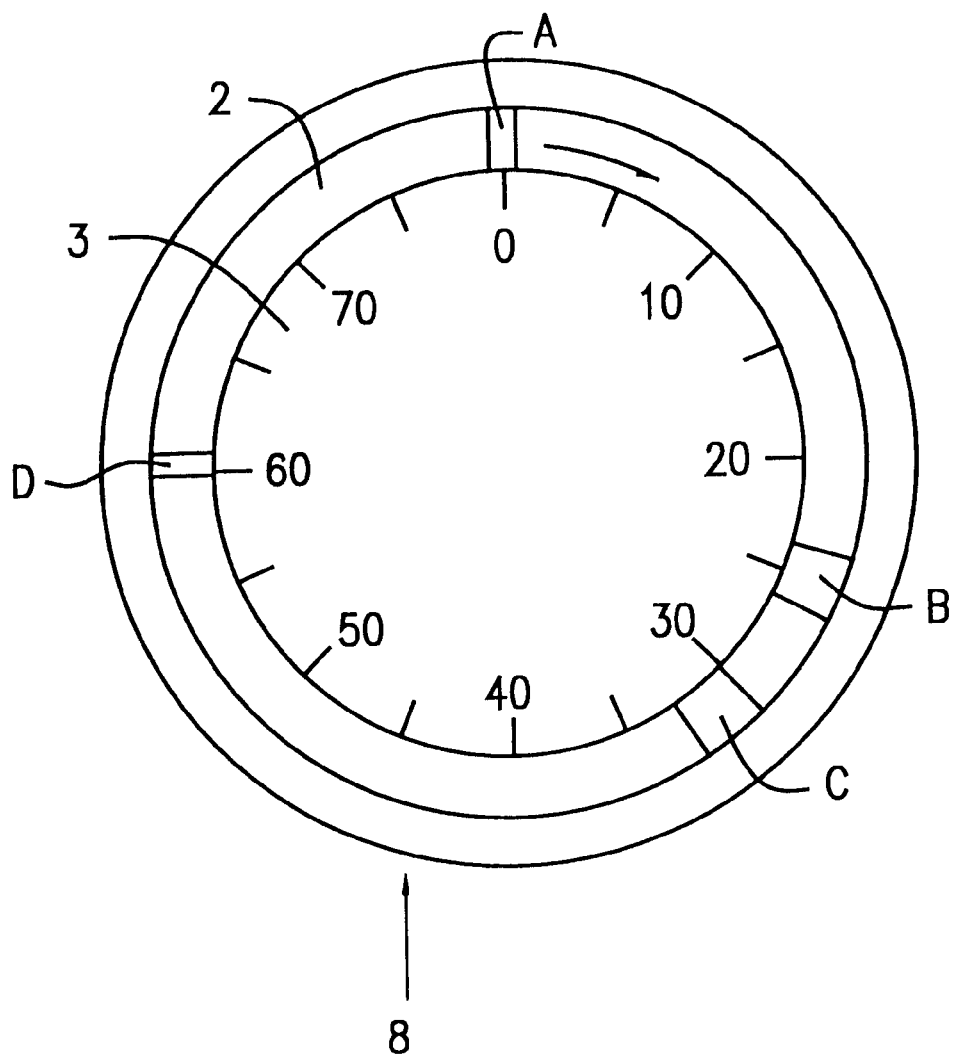
FIG. 2 is a front view of the flasher display of FIG. 1.
Figure 3:
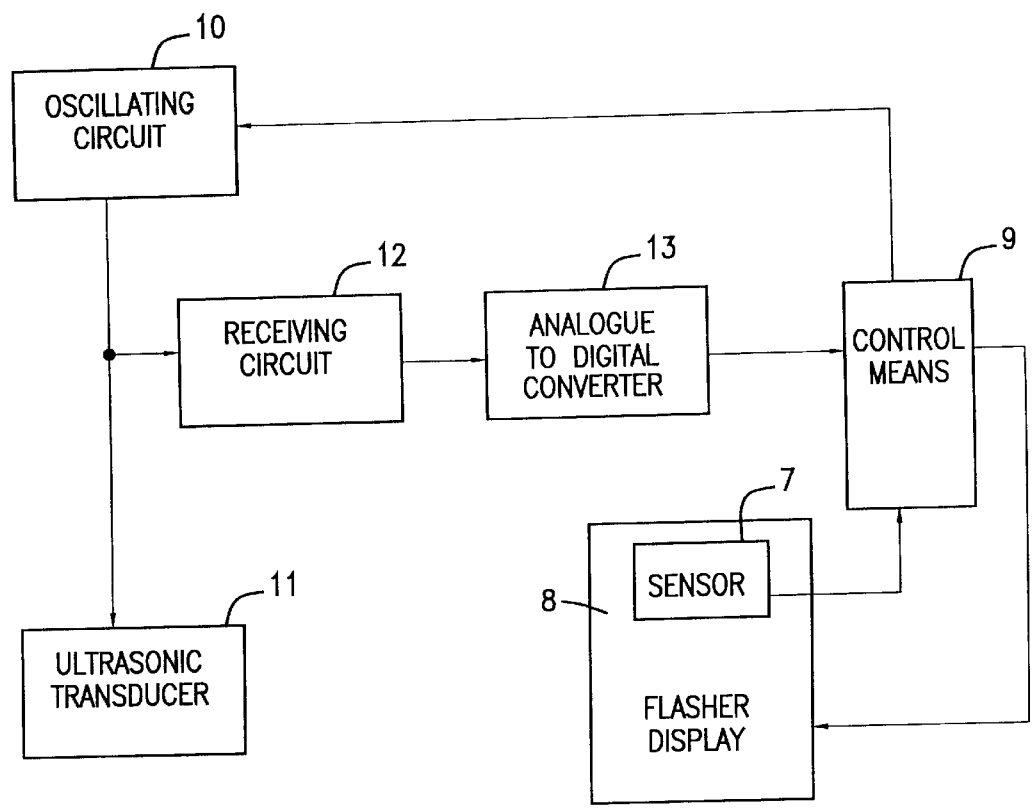
FIG. 3 is a block diagram of the flasher type fish sonar of FIG. 1.

As shown in FIG. 1, FIG. 2 and FIG. 3, in a prior art flasher type fish sonar, a circular window 2 is formed in the periphery of a display board 3 provided at the front of a case 1, light emitting body 5 mounted on a rotatable disk 4 is arranged opposite the window 2, the rotatable disk 4 is arranged to be rotated by a motor 6 and a sensor 7 is fixed at the "0" position A of the display board 3, a flasher display 8 is formed.

In this flasher display 8, when the light emitting body 5 is detected by the sensor 7, output signals from a control means 9 are applied to an oscillating circuit 10, oscillating signals fro the oscillating circuit 10 are applied to an ultrasonic transducer 11, and ultrasonic waves from the ultrasonic transducer 11 are emitted to the water.

When reflected ultrasonic waves are received by the ultrasonic transducer 11 and are converted to reflected signals by the ultrasonic transducer 11, the reflected signals are amplified by a receiving circuit 12 and are converted to digital reflected signals by an analogue to digital converter 13. The digital reflected signals are transmitted to the control means 9. Digital reflected signals are transmitted from the control means 9 to the light emitting body 5 of the flasher display 8 whereby the position of fish and the bottom of the water are displayed in the window 2 of the flasher display 8.

In such flasher type fish sonar, because the "0" graduation is fixed on the upper portion of the display board, each depth graduation is shown on the display board by right-handed rotation, and the graduation of the deepest portion is shown near the "0" graduation. The position of the reflected signal of the bottom is displayed at a position on the display which is above the bottom of the display and above the fish displays B and C. Thus, it is hard to distinguish the position of the "0" graduation and the position of the bottom reflected signal. Also, in deep water, because the position of the bottom is displayed on the portion of the display which is above the position of the fish, it is hard to distinguish the position of the "0" graduation and the position of the bottom.

Figure 4:
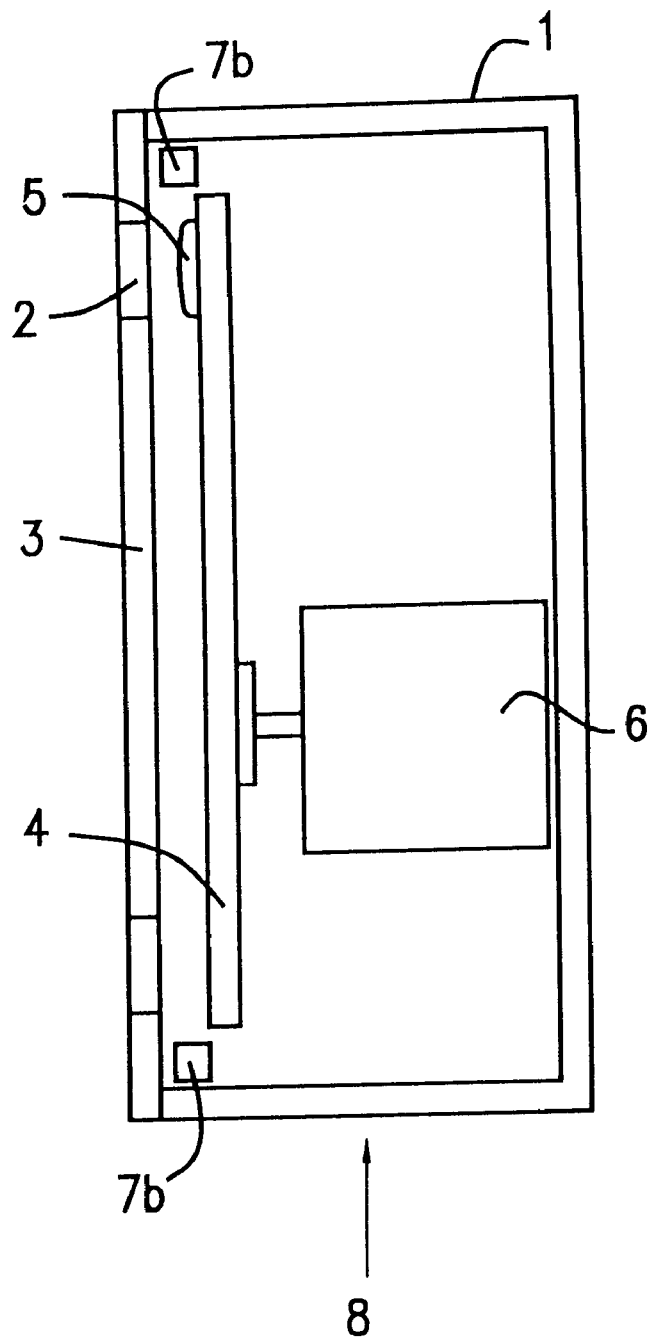
FIG. 4 is a side sectional view of a flasher display of a flasher type fish sonar of the present invention.
Figure 5:
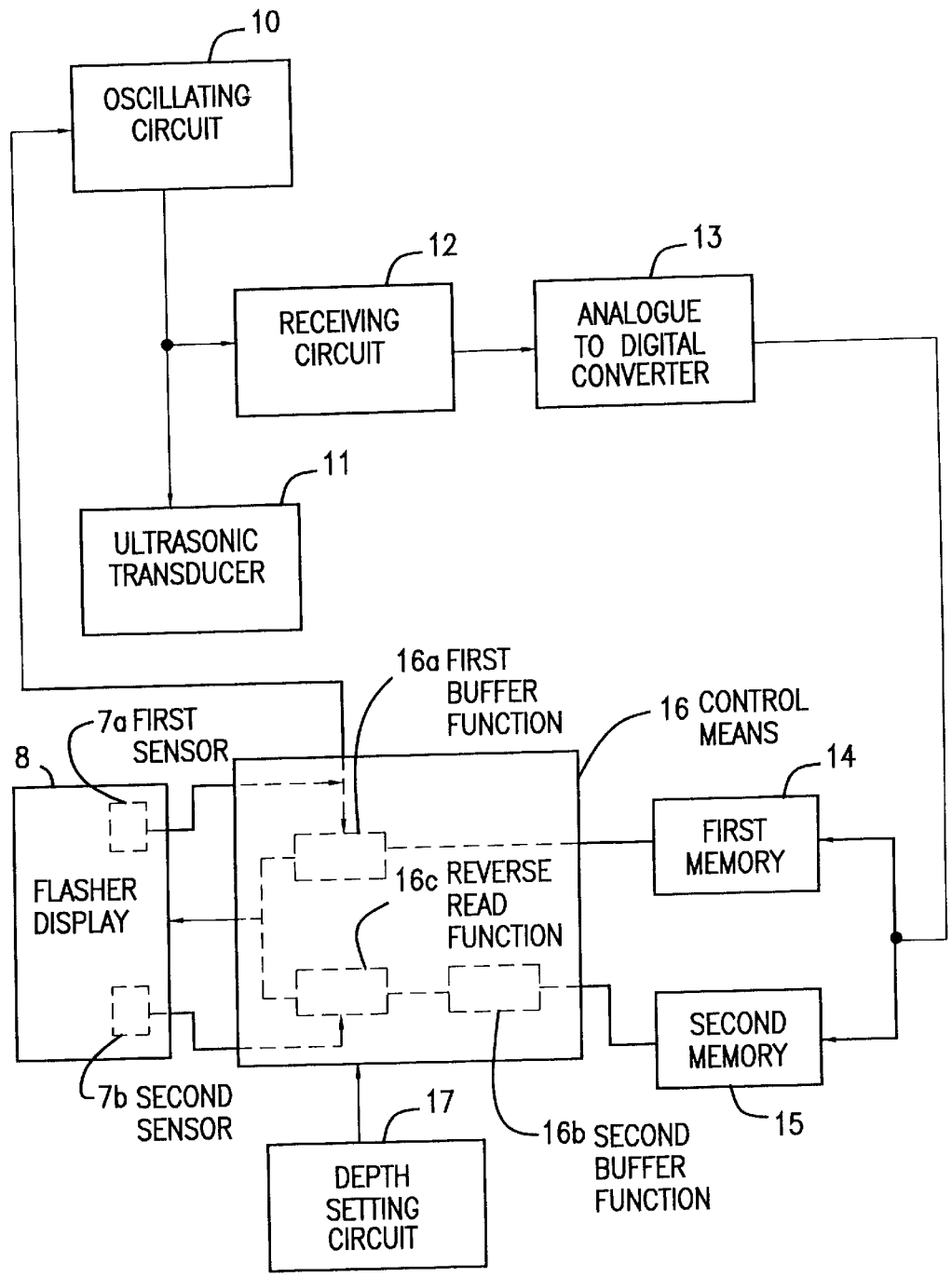
FIG. 5 is a block diagram of the flasher type fish sonar of the present invention.

Referring to FIGS. 4 and 5, 1 designates a case; 2, a circular window; 3, a display board; 4, a rotary disc; 5, a light emitting body; 6, a motor; 8, a flasher display; 10, a transmitting circuit; 11, an ultrasonic transducer; 12, a receiving circuit; and 13, an analogue to digital converter. Since the function and operation of these components are the same as those in the prior art, an explanation of the operation and function of the components is omitted.

In the present invention, a first sensor 7a is mounted at the position of the "0" graduation on the display board 3 of the flasher display 8, a second sensor 7b is mounted at a position opposite to the position of the "0" graduation. First and second memories 14 and 15 are connected to the output terminal of the analogue to digital converter 13, the output terminal of the first memory 14 is connected to a first buffer function means 16a of the control means 16, the output terminal of the second memory 15 is connected to a second buffer function means 16b, the output terminal of the second buffer function means 16b is connected to a reverse read function means 16c, and the output terminals of the first buffer function means 16a and the reverse read function means 16c are connected to the light emitting body 5 of the flasher display 8. Also, the output of the first sensor 7a of the flasher display 8 is applied to the control means 16 to operate the first buffer function means 16a; the output of the second sensor 7b is applied to the control means 16 to operate the reverse read function means 16c. A depth setting circuit means 17 is connected to the control means 16.

Explaining the operation of the present invention, in the flasher type fish sonar, the rotary disc 4 of the flasher display 8 is rotated by the motor 6, when the light emitting body 5 is passed through the position of the first sensor 7a, the output signals from the control means 16 are applied to the oscillating circuit 10 by an output signal from the first sensor 7a, the oscillating signals from the oscillating circuit 10 are applied to the ultrasonic transducer 11. The ultrasonic waves from the ultrasonic transducer 11 are emitted to the water. The ultrasonic waves reflected by objects in the water are received by the ultrasonic transducer 11 and converted to reflected signals. The reflected signals from the ultrasonic transducer 11 are amplified by the receiving circuit 12 and are converted to digital reflected signals by the analogue to digital converter 13.

Figure 6:
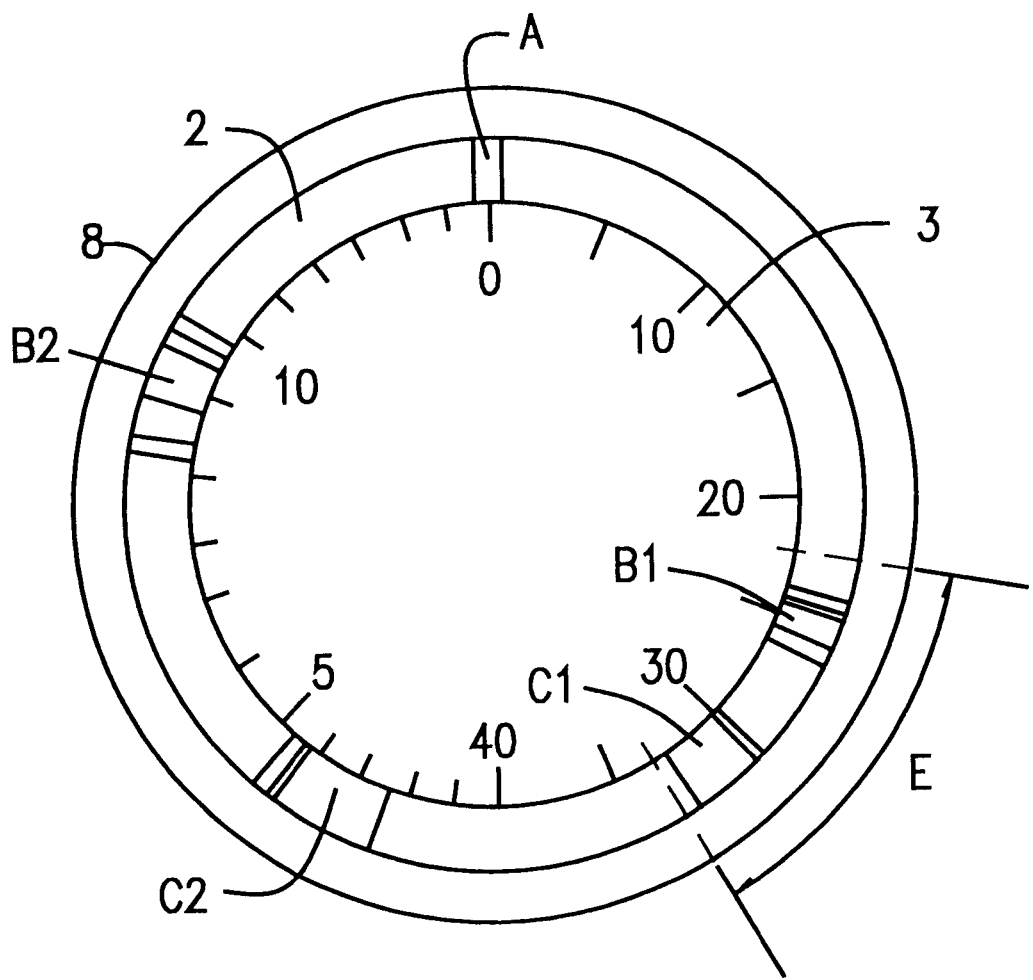
FIG. 6 is a front view of the flasher display of FIG. 4.

When the digital reflected signals from the analogue to digital converter 13 are applied to the first and second memories 14 and 15, the control means 16 read out the reflected digital signals from the first and second memories 14 and 15 and the reflected digital signals are stored in the first and second buffer function means 16a and 16b. When the light emitting body 5 is detected by the first sensor 7a, the control means 16 reads out a signal of the surface of the water whereby the light from the light emitting body 5 is emitted on the "0" position as shown in FIG. 6 and the position of the surface A of the water is shown on the circular window 2 of the display board 3 by the light emitting body 5. The position of the fish B1 and the bottom C1 are shown on the circular window 2 of the display board 3 by emission of the light emitting body 5 by a reading of the reflected digital signals from the first buffer function means 16a.

When the detected digital signal is applied to the control means 16 by detection of the light emitting signal body 5 by the second sensor 7b, the reflected digital signals stored by the second buffer function means 16b to the depth range set by the depth setting circuit 17 are reversely read and the position of the bottom C2 and the fish B2 are enlarged and shown on the circular window 2 of the display board 3.

In this flasher type fish sonar, the first and second sensors 7a and 7b are provided in the flasher display 8, and the reflected digital signals owing to the depth range E set by the depth setting circuit 17 are stored in the second buffer function means 16b. After the light emitting body 5 is detected by the second sensor 7b, the reflected digital signals stored in the second buffer function means 16b are displayed in the reverse order of the bottom C2 and the fish B2 by the reverse read function means 16c. Therefore, seeing the display board 3 of the flasher display 8, because the surface A is displayed at the upper position, the bottoms C1 and C2 are displayed on the lower positions and the fish B2 and the bottoms C2 are displayed enlarged The display of the flasher display 8 is easy to understand.

Figure 7:
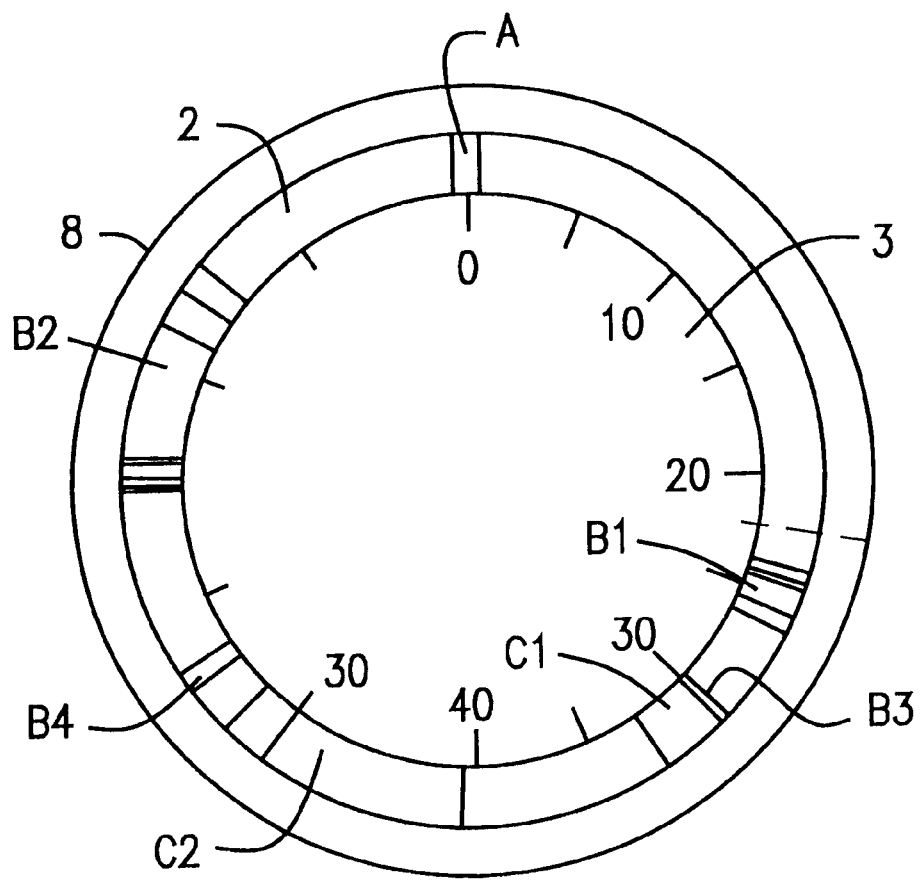
FIG. 7 is a flasher display of an embodiment of the present invention showing fish at two depths partly enlarged.

As shown in FIG. 7, when the bottom C2 is instantaneously displayed after the light emitting body 5 is detected by the second sensor 7b; the fish B3 present near the bottom C1 are displayed enlarged as B4 near bottom C2; fish near the surface are shown enlarged as B2.

Figure 8:
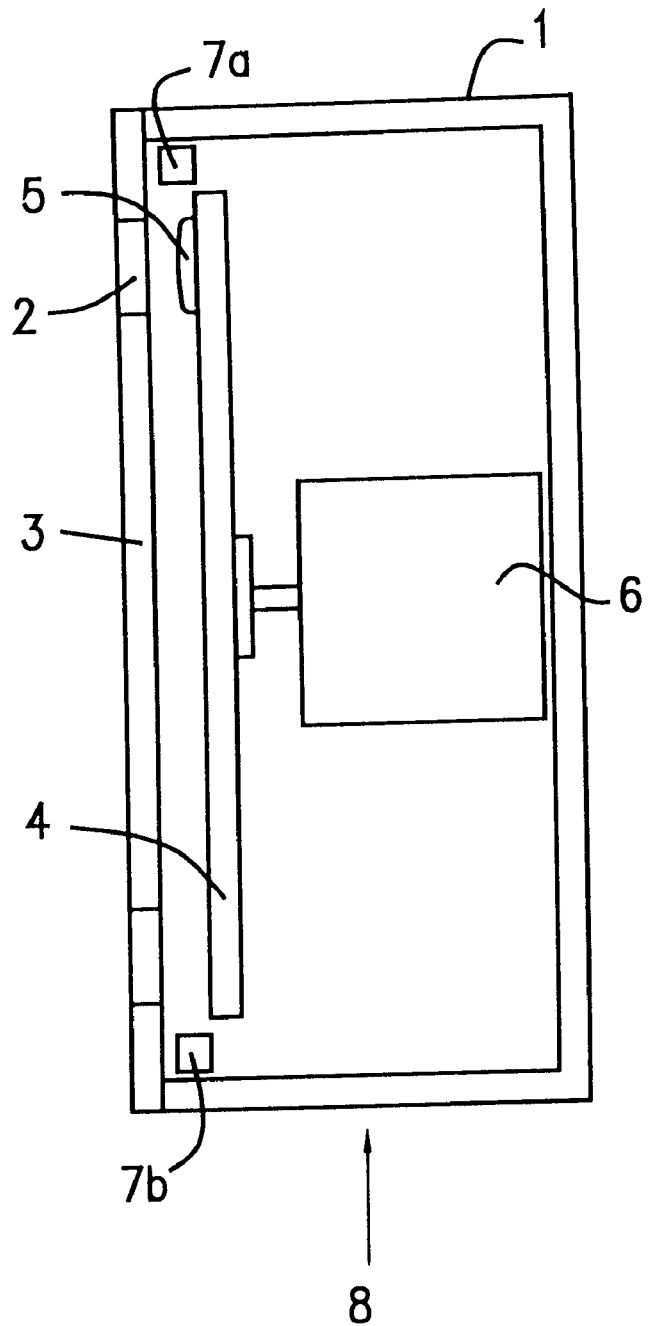
FIG. 8 is a flasher display of a second embodiment of the present invention.
Figure 9:
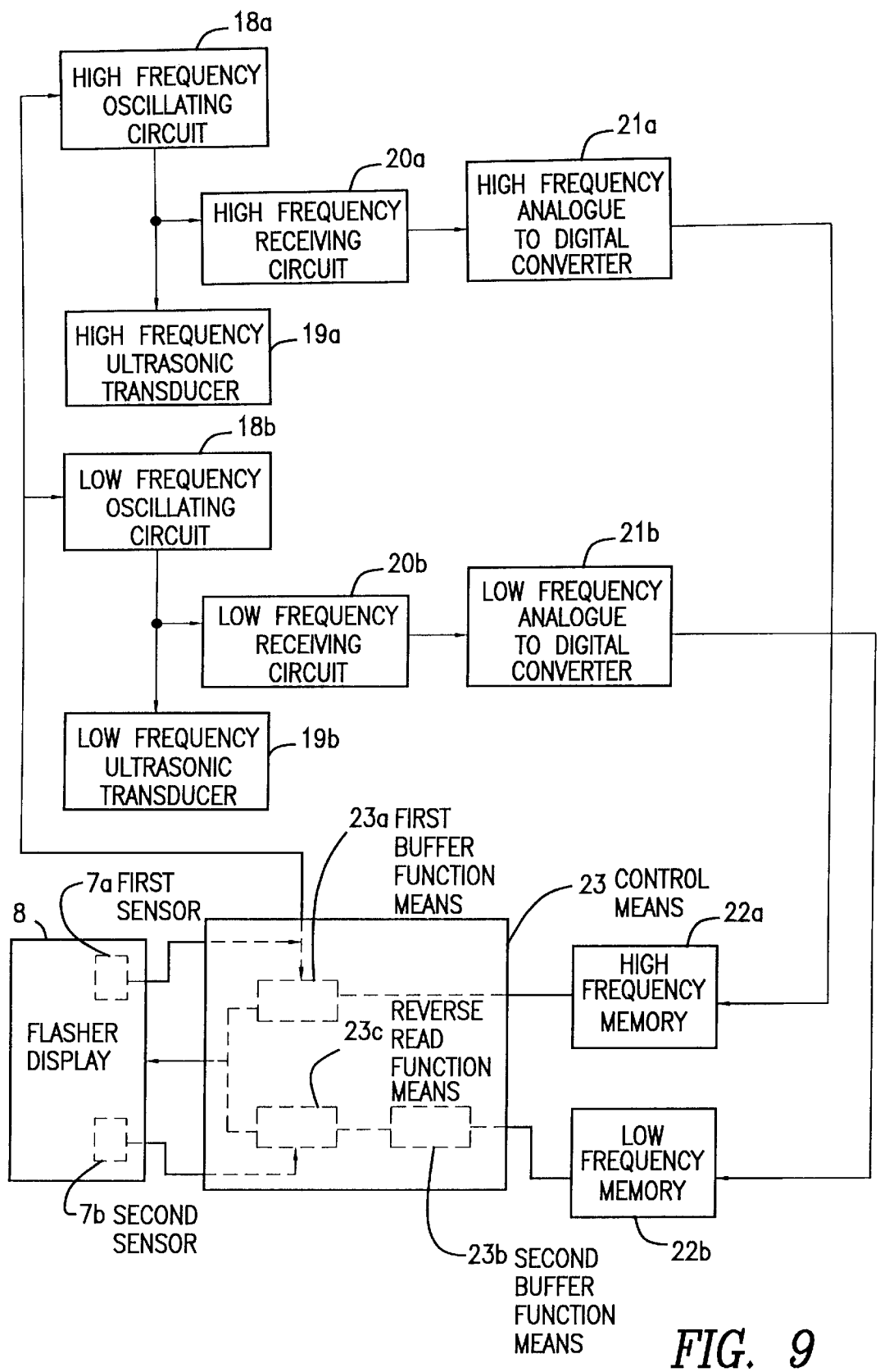
FIG. 9 is a block diagram of the flasher type fish sonar of the second embodiment of the present invention.

Referring to FIGS. 8 and 9, 1 designates a case; 2, a circular window; 3, a display board; 4, a rotary disc; 5, a light emitting body; 6, a motor; 7a, a first detector; 7b, a second detector; 8, a flasher display; 10, an oscillating circuit; 11, an ultrasonic transducer; 12, a receiving circuit and 13, an analogue to digital converter. Since the function and operation of these components are same as those of the above embodiments, an explanation of their function and operation is omitted.

In the present invention, a first sensor 7a is mounted at a position of "0" graduation on the display board 3 of the flasher display 8; a second sensor 7b is mounted at a position opposite to the position of the "0" graduation. An output terminal of a high frequency oscillating circuit 18a and an input terminal of a high frequency receiving circuit 20a are connected to a high frequency ultrasonic transducer 19a. An output terminal of a low frequency oscillating circuit 18b and an input terminal of a low frequency receiving circuit 20b are connected to a low frequency ultrasonic transducer 19b. The output terminal of the high frequency receiving circuit 20a is connected to an input terminal of a high frequency analogue to digital converting circuit 21a. The output terminal of the low frequency receiving circuit 20b is connected to an input terminal of a low frequency analogue to digital converting circuit 21b. The output terminal of the high frequency analogue to digital converting circuit 21a is connected to an input terminal of a high frequency memory 22a. The output terminal of the low frequency analogue to digital converting circuit 21b is connected to an input terminal of a low frequency memory 22b. The output terminal of the high frequency memory 22a is connected to a first buffer function means 23a of control means 23. The output terminal of the low frequency memory 22b is connected to a second buffer function means 23b of the control means 23, and the output terminal of the second buffer function means 23b is connected to an input terminal of a reverse read function 23c of control means 23. The output terminals of the first buffer function means 23a and the reverse read function means 23c are connected to the flasher display 8. The signals for operating the first buffer function means 23a and signals for operating the high frequency oscillating circuit 18a and the low frequency oscillating circuit 18b are applied to the control means 23, and the signals for operating the reverse read function means 23c are applied to the control means.

In this flasher type fish sonar, the rotary disc 4 of the flasher display 8 is rotated by the motor 6; the oscillating signals from the control means 23 are applied to the high frequency oscillating circuit 18a and the low frequency oscillating circuit 18b by the signals of the first sensor 7a when the light emitting body 5 is detected by the first sensor 7a. When the oscillating signals from the high frequency oscillating circuit 18a and the low frequency oscillating circuit 18b are respectively applied to the high frequency ultrasonic transducer 19a and the low frequency ultrasonic transducer 19b, the high frequency ultrasonic waves and the low frequency ultrasonic waves are emitted to the water. The high frequency reflected ultrasonic waves and the low frequency reflected ultrasonic waves are respectively received by the high frequency ultrasonic transducer 19a and the low frequency ultrasonic transducer 19b and are converted to high frequency reflected signals and low frequency reflected signals. The high frequency reflected signals and the low frequency reflected signals are respectively amplified by the high frequency receiving circuit 20a and the low frequency receiving circuit 20b and are respectively applied to the high frequency analogue to digital converter 21a and the low frequency analogue to digital converter 21b and are respectively converted to high frequency reflected digital signals and low frequency reflected digital signals. The high frequency reflected digital signals and the low frequency reflected digital signals are respectively memorized in the high frequency memory 22a and the low frequency memory 22b, and the high frequency reflected digital signals and the low frequency reflected digital signals read from the high frequency memory 22a and the low frequency memory 22b are respectively stored in the first and second buffer function means 23a and 23b.

Figure 10:
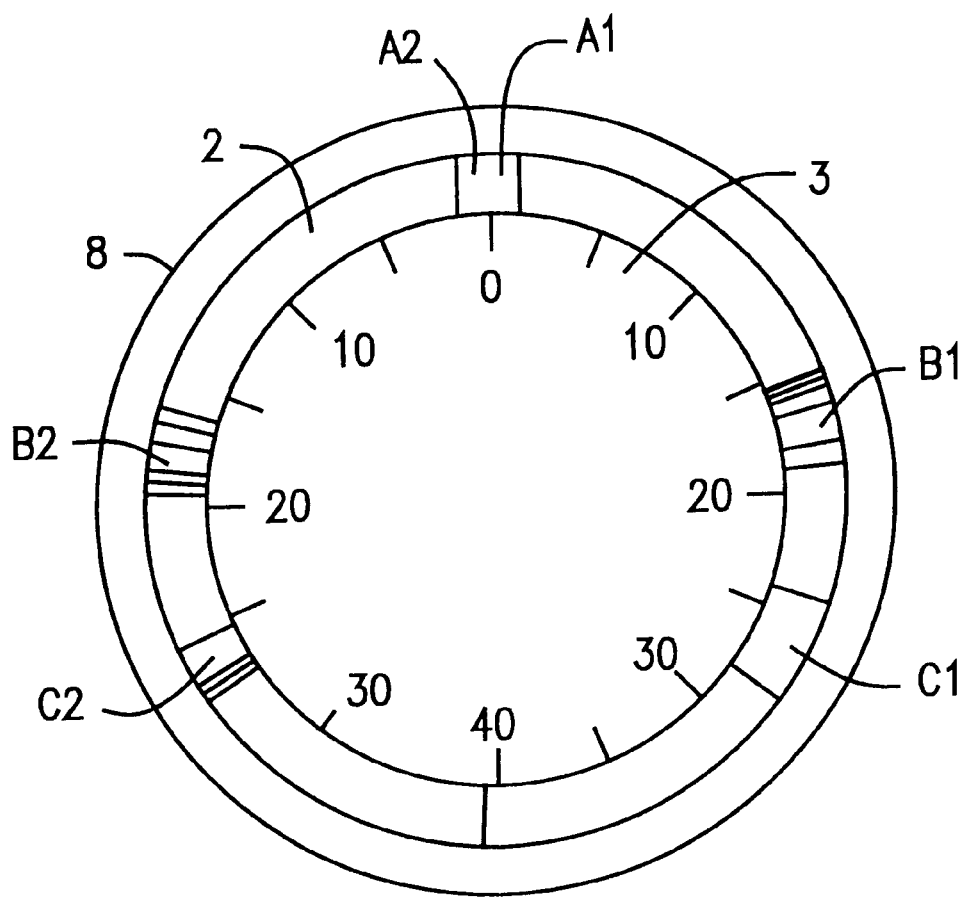
FIG. 10 is a flasher display of the second embodiment of the present invention.

When the light emitting body 5 is detected by the first sensor 7a, as shown in FIG. 10, the control means 23 reads out the high frequency reflected digital signals of the surface A1 of the water at the "0" position of the display board 3 from the first buffer function 23a and light from the light emitting body 5 is emitted. The high frequency reflected digital signals of the fish B1 and the bottom C1 are read out from the first buffer function means 23a and the light from light emitting body 5 are emitted on the display board 3 in turn.

When the light emitting body 5 is detected by the second sensor 7b and the detected signal is applied to the control means 23, the low frequency reflected digital signals storing the second buffer function means 23b of the control means 23 are read out in order as the bottom C2, the fish B2 and the surface A2 and are displayed on the display board 3 by emitted light of the light emitting body 5.

In FIG. 10, the high frequency signals are displayed on the right side of the display board 3 and the low frequency signals are displayed on the left side of the display board 3. When the rotation of the rotary disc 4 is reversed, the high frequency reflected digital signals are displayed on the left side of the display board 3 and the low frequency reflected digital signals are displayed on the right side of the display board 3.

What is claimed is:

1. A flasher type fish sonar comprising an oscillating circuit for providing oscillating signals to an ultrasonic transducer for emission to water, a receiving circuit for amplifying reflected signals, to which reflected ultrasonic waves of ultrasonic waves emitted in water by the ultrasonic transducer are received and converted by the ultrasonic transducer, an analogue to digital converter for converting the reflected signals amplified by the receiving circuit to reflected digital signals, first and second memories for memorizing the reflected digital signals, a control means having first and second buffer function means for storing the reflected digital signals read out from the first and second memories respectively, a reverse read function means for reversely reading out the reflected digital signals from the second buffer function means, and a flasher display comprising a display board having a circular window, a rotary disc for mounting a light emitting body opposite to the circular window, the light emitting body emitting light in response to application of the reflected digital signals from the first and second buffer function means, a first sensor installed on a "0" position of the display disc and a second sensor installed at a position opposite the "0" position, whereby the reflected digital signals of a surface of the water, fish and a bottom are displayed by a usual scale on a first half portion of the display board by reading out the reflected digital signals in the first buffer function means of the control means when the light emitting body is detected by the second sensor opposite the "0" position, and reflected digital signals of fish and a bottom are reversely read from the second buffer function means and are displayed in an enlarged scale on a second half portion of the display board when the light emitting body is detected by the second sensor.

2. A flasher type fish sonar as set forth in claim 1 wherein the reflected digital signal of the bottom read out from the second buffer function means of the control means is displayed by the light of the light emitting body after a constant time when the light emitting body is detected by the second sensor.

3. A flasher type fish sonar comprising a high frequency oscillating circuit for providing high frequency oscillating signals to a high frequency ultrasonic transducer, a low frequency oscillating circuit for providing low frequency oscillating signals to a low frequency ultrasonic transducer, a high frequency receiving circuit for amplifying high frequency reflected signals to which high frequency reflected ultrasonic waves of high frequency ultrasonic waves emitted in water by the high frequency ultrasonic transducer are received and converted by the high frequency transducer frequency receiving circuit, a low frequency receiving circuit for amplifying low frequency reflected signals to which low frequency reflected ultrasonic waves of low frequency ultrasonic waves emitted in water by the low frequency ultrasonic transducer are received and converted by the lower frequency transducer, a high frequency analogue to digital converter for converting the high frequency reflected signals amplified by the high frequency receiving circuit to high frequency reflected digital signals, a low frequency analogue to digital converter for converting the low frequency reflected signals amplified by the low frequency receiving circuit to low frequency reflected digital signals, a high frequency memory for memorizing the high frequency reflected digital signals from the high frequency analogue to digital converter, a low frequency memory for memorizing the low frequency reflected digital signals from the low frequency analogue to digital converter, a control means having first and second buffer function means for storing the high and low reflected digital signals read out from the high frequency and low frequency memories respectively and a reverse read function means for reversely reading out the low frequency reflected digital signals from the second buffer function means, and a flasher display having a display board having a circular window, a rotary disc carrying a light emitting body opposite the circular window which emits light by application of the high frequency and low frequency reflected digital signals from the first and second buffer function means, a first sensor installed at a "0" position of the display disc and a second sensor installed on a position opposite to the "0" position, whereby the high frequency reflected digital signals of a surface of the water, fish and a bottom are displayed in a scale on a first half portion of the display board by reading out the high frequency reflected digital signals from the first buffer function means of the control means when the light emitting body is detected by the first sensor at the "0" position, and low frequency reflected digital signals of fish and a bottom are reversely read from the second buffer function means and are displayed on an enlarged scale on a second half portion of the display board when the light emitting body is detected by the second sensor.

* * * * *